United States Patent
Mori

(10) Patent No.: US 8,456,673 B2
(45) Date of Patent: Jun. 4, 2013

(54) PRINTING SYSTEM FOR SWITCHING CONNECTION MODES BY INSERTING OR REMOVING A RECORDING MEDIUM

(75) Inventor: Tomokazu Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 12/581,760

(22) Filed: Oct. 19, 2009

(65) Prior Publication Data
US 2010/0097648 A1    Apr. 22, 2010

(30) Foreign Application Priority Data
Oct. 20, 2008   (JP) .................................. 2008-270129

(51) Int. Cl.
*G06F 3/12*  (2006.01)

(52) U.S. Cl.
USPC ........... 358/1.15; 725/133; 725/141; 725/153

(58) Field of Classification Search
USPC .................. 358/1.1–1.16; 725/133, 141, 153
See application file for complete search history.

(56) References Cited

U.S. PATENT DOCUMENTS

| | | | |
|---|---|---|---|
| 7,856,491 B2 * | 12/2010 | Kamata et al. ................ | 709/222 |
| 2005/0262274 A1 | 11/2005 | Aoki | |
| 2005/0278755 A1 * | 12/2005 | Kuo et al. ...................... | 725/80 |
| 2007/0003308 A1 * | 1/2007 | Kim ................................ | 399/81 |
| 2007/0223023 A1 * | 9/2007 | Yamazaki ..................... | 358/1.12 |
| 2008/0250180 A1 * | 10/2008 | Chang et al. .................. | 710/301 |

FOREIGN PATENT DOCUMENTS

JP    2004-139386    5/2004

* cited by examiner

*Primary Examiner* — Benny Q Tieu
*Assistant Examiner* — Michael Y Tzeng
(74) *Attorney, Agent, or Firm* — Carter, DeLuca, Farrell & Schmidt LLP

(57) ABSTRACT

A display control apparatus includes a communication control unit configured to control a first communication for receiving a video signal based on image data from a printing apparatus using a first communication protocol for receiving a video signal, and a second communication for sending image data to the printing apparatus using a second communication protocol for sending data to be used for printing. The communication control unit performs control to communicate with the printing apparatus using the second communication protocol in response to a storage medium being connected to the display control apparatus, and performs control to communicate with the printing apparatus using the first communication protocol in response to receiving a notification indicating that a storage medium is connected to the printing apparatus.

8 Claims, 9 Drawing Sheets

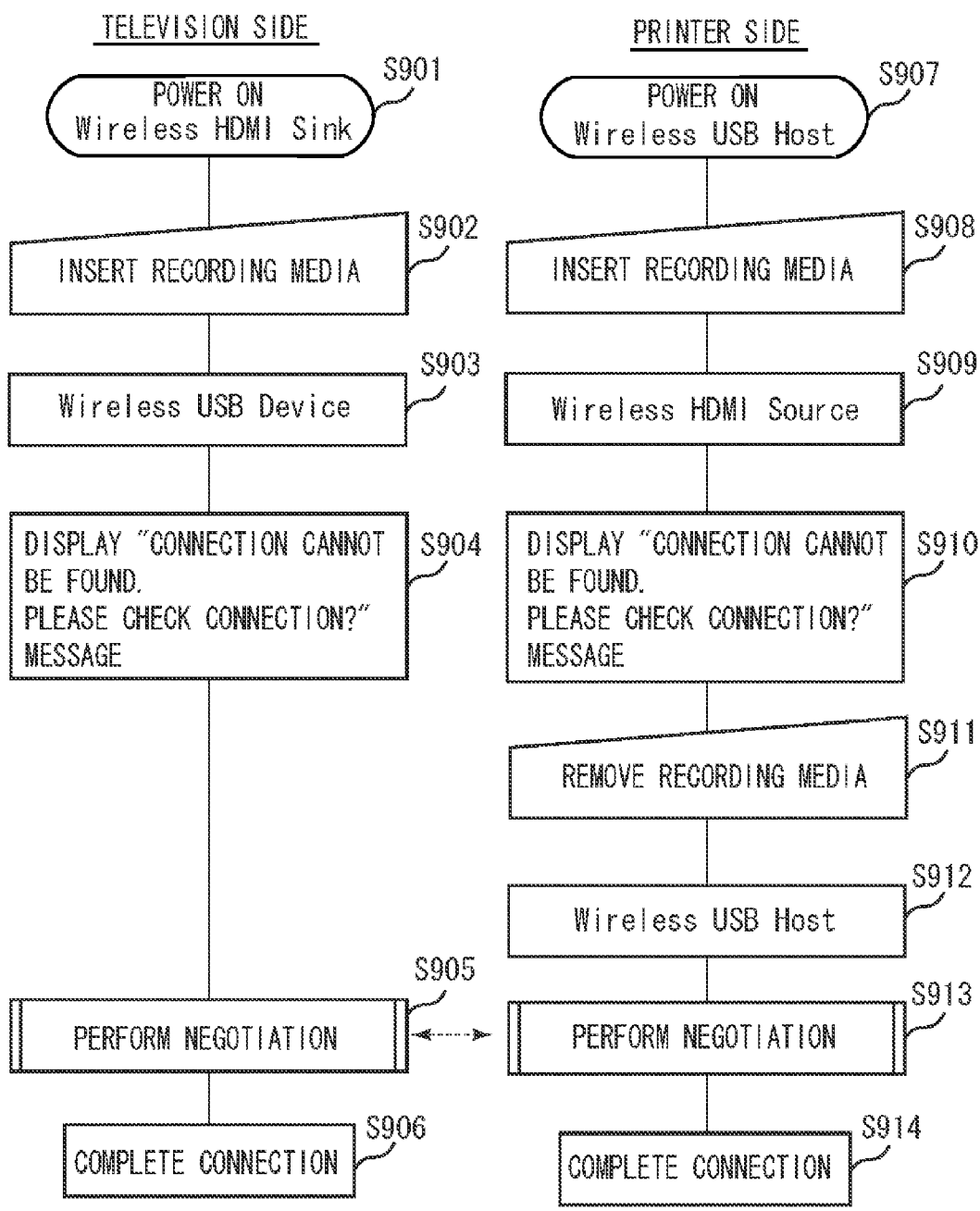

PRINTING SYSTEM FOR SWITCHING CONNECTION MODES BY INSERTING OR REMOVING A RECORDING MEDIUM

BACKGROUND OF THE INVENTION

1. Field of the Invention

The present invention relates to a display control apparatus and printing apparatus. More specifically, the present invention relates to a suitable technology used for confirming and printing an image.

2. Description of the Related Art

Current printers have a card slot which can be inserted with a recording medium on which digital image data (hereinafter, "image data") captured by a digital camera and the like is recorded. There are also printers which can print by themselves images relating to image data recorded on a recording medium, without the printer being connected to a personal computer (PC).

Such printers typically can display an image and a print menu on a dedicated liquid crystal monitor provided on the printer, and can perform various settings and print processing by an operation panel based on that display. However, printer-dedicated liquid crystal monitors are small, which can make it difficult for a user to view the image. Consequently, there has been a proposal which attempts to improve convenience by displaying the image and print menu on an external monitor connected to the printer (Japanese Patent Application Laid-Open No. 2004-139386).

While a PC monitor may be used as the external monitor, a digital television (hereinafter, "television") can also be used. Some current televisions have a card slot into which a recording medium can be inserted, so that images relating to image data recorded on the recording medium can be viewed on a large screen in high-definition. Further, with a printer connected to such a television, the image can be printed by an operation on the television.

Therefore, by connecting the television and the printer, the user can send print data to the printer while viewing the image on the television, and can view the printing situation in the printer on the television. An example of a method for connecting these devices for the former case is Universal Serial Bus (USB), and for the latter case High-Definition Multimedia Interface (HDMI). Thus, considering that these devices will be wirelessly connected by the above-described communication methods, it is desirable to mount only a single wireless communication unit so that the mounting surface area of the hardware for each of the devices is as small as possible.

Therefore, when the user sends print data to the printer while viewing the television image, or when the user views the printing situation in the printer on the television, the communicating devices can be connected by two connection methods (USB or HDMI). However, it is troublesome for the user to manually select between these two connection methods depending on the intended use.

SUMMARY OF THE INVENTION

The present invention is directed to a display control apparatus which enables simple selection of the connection method to be used depending on the intended use.

According to an aspect of the present invention, a display control apparatus capable of communicating with a printing apparatus connectable to a removable storage medium includes a connection unit configured to allow a removable storage medium to be connected thereto, and a communication control unit configured to control a first communication for receiving a video signal based on image data from the printing apparatus using a first communication protocol for receiving a video signal, and a second communication for sending image data to the printing apparatus using a second communication protocol for sending data to be used for printing, wherein the communication control unit performs control to communicate with the printing apparatus using the second communication protocol in response to a storage medium being connected to the connection unit, and performs control to communicate with the printing apparatus using the first communication protocol in response to receiving a notification indicating that a storage medium is connected to the printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a flowchart illustrating an example of a connection processing sequence when recording media are simultaneously inserted into a television and a printer, according to a fourth exemplary embodiment of the present invention.

DESCRIPTION OF THE EMBODIMENTS

Various exemplary embodiments, features, and aspects of the invention will be described in detail below with reference to the drawings.

Figure 1:
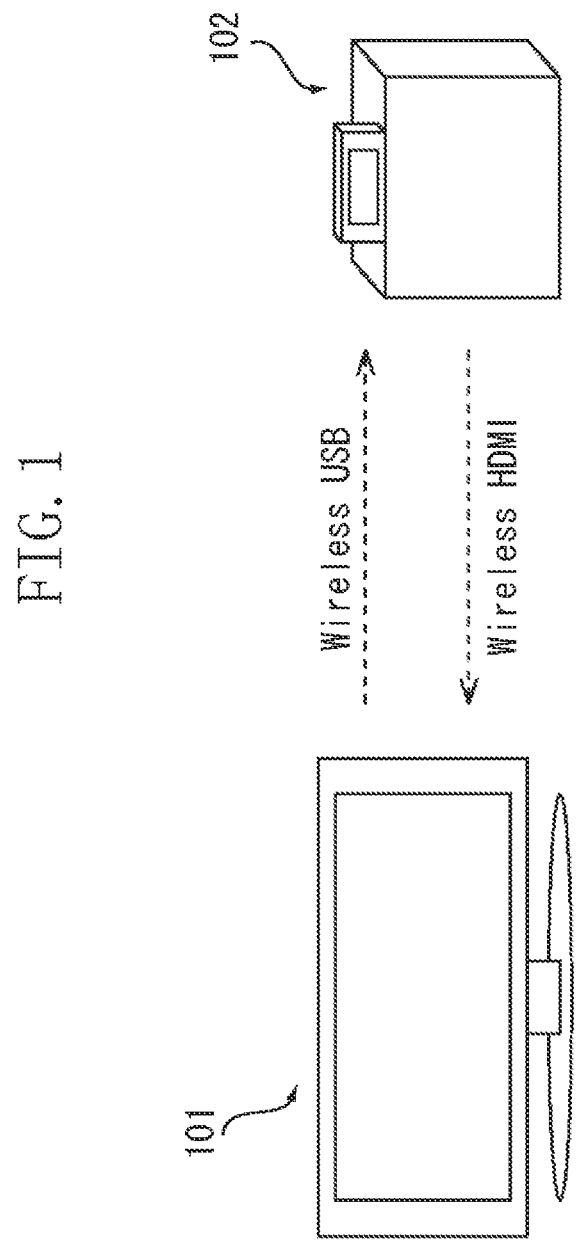
FIG. 1 illustrates an example of a printing system according to a first exemplary embodiment of the present invention.

FIG. 1 illustrates an example of a printing system according to a first exemplary embodiment of the present invention.

In FIG. 1, a television 101 having a wireless communication function and a printer 102 also having a wireless communication function can be wirelessly connected by wireless USB (hereinafter, WUSB) or wireless HDMI (hereinafter, WHDMI).

An example of the USB connection illustrated in FIG. 1 is when an image the user likes is displayed when the user is viewing images relating to image data recorded on a recording medium which is inserted into the television 101. In this case, a print processing command from the television 101 is executed by operation of a remote control, and the print data is sent to the printer 102.

Further, an example of the HDMI connection is when the recording medium is inserted into the printer 102 and printing is performed. In this case, because it is difficult to confirm the image or menu on the small liquid crystal monitor installed on the printer 102, the printer 102 outputs an image signal to the television 101, and that image can be viewed on the large screen of the television 101 during print processing.

Figure 2:
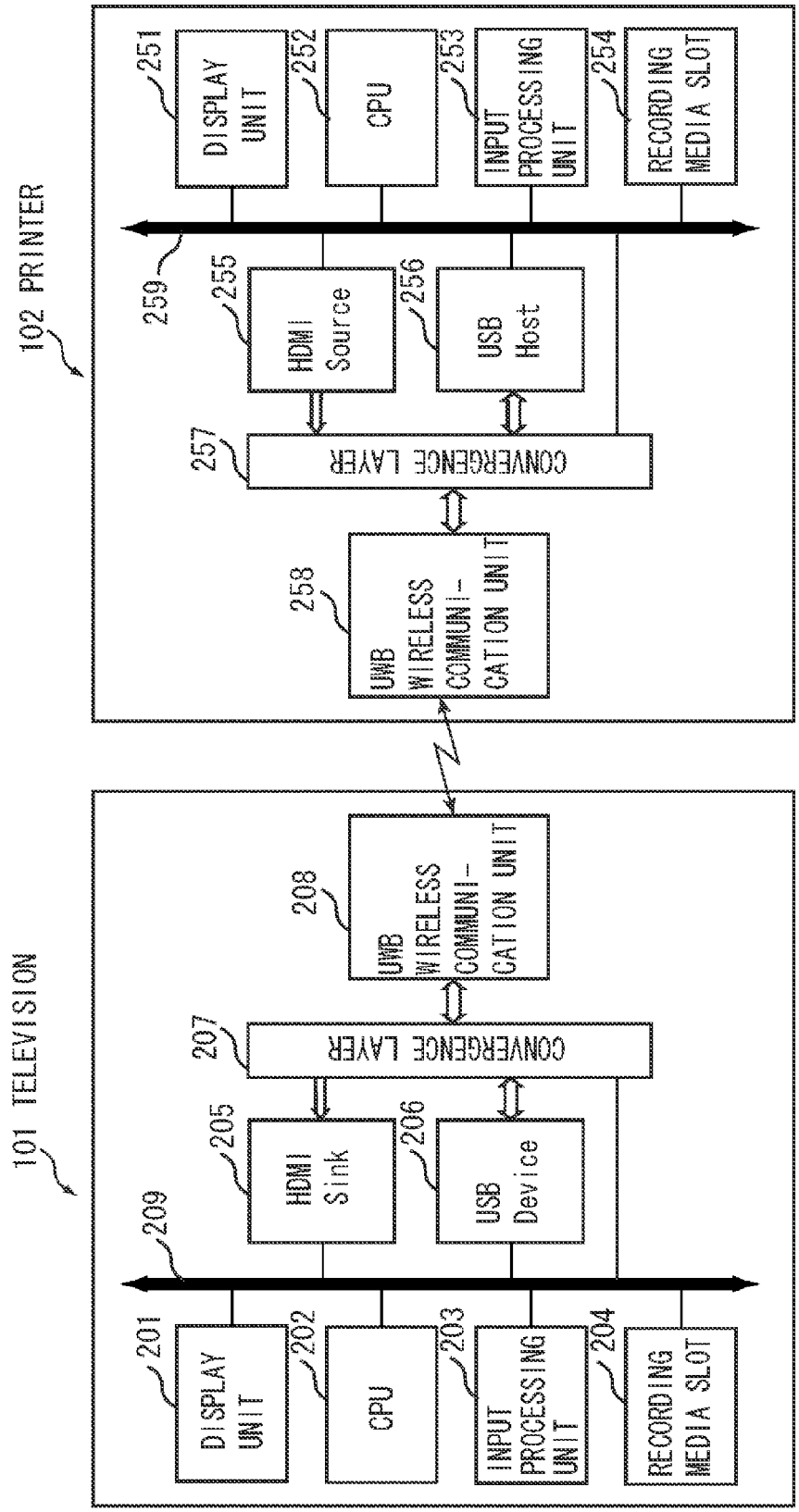
FIG. 2 is a block diagram illustrating a configuration example of a television and a printer according to a first exemplary embodiment of the present invention.

FIG. 2 is a block diagram illustrating a configuration example of the printing system illustrated in FIG. 1. FIG. 2 illustrates a basic configuration example of the television 101 and printer 102 illustrated in FIG. 1.

In the television 101 illustrated in FIG. 2, images, menus and the like are displayed on a display unit 201. A central processing unit (202) performs various kinds of control via a bus 209, such as switching the wireless communication method when a recording medium is detected as having been inserted as the recording medium into a recording media slot 204.

An input processing unit 203 processes various user commands which are input from a not-illustrated remote control, operation panel or the like. The recording media slot 204 is an insertion aperture into which various media on which image data is recorded can be mounted. An HDMI sink 205 performs image signal processing and control signal processing based on an HDMI protocol as a first communication protocol. A USB device 206 performs data processing based on a USB protocol as a second communication protocol. A convergence layer 207 performs coordination control between the USB and HDMI protocols. Further, an ultrawideband (UWB) wireless communication unit 208 performs UWB communication with the printer 102.

The printer 102 similarly has a display unit 251, a CPU 252, an input processing unit 253, a recording media slot 254, an HDMI source 255, a USB host 256, a convergence layer 257, a UWB wireless communication unit 258, and a bus 259. The control in each of the devices may be performed by a single piece of hardware, or may be performed so that a plurality of pieces of hardware function as a unit for controlling the devices as a whole by sharing the processing.

Figure 3:
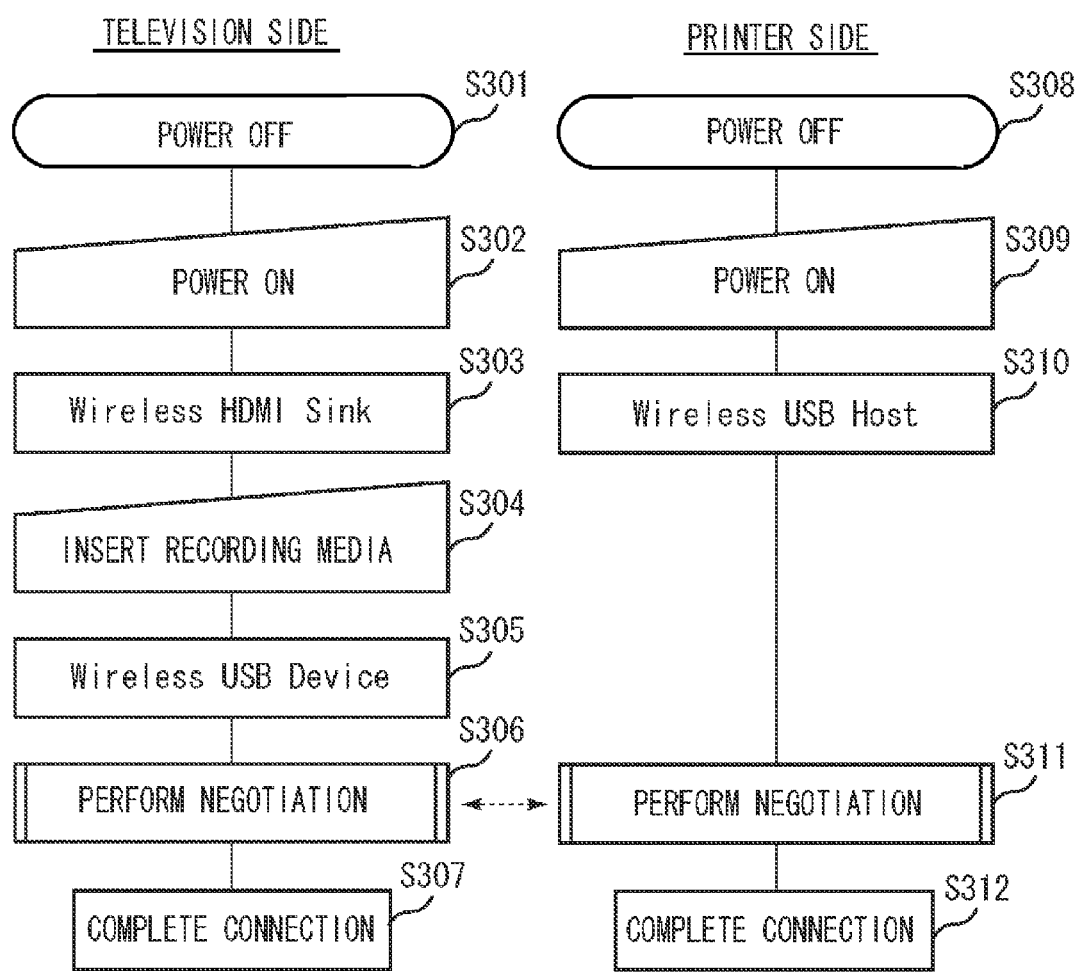
FIG. 3 is a flowchart illustrating an example of the sequence of operations from the point where the power is turned on when a recording medium is inserted into a television until wireless connection is established, according to a first exemplary embodiment of the present invention.

FIG. 3 is a flowchart illustrating an example of the sequence of operations from the point where the power is turned on when the recording medium is inserted into the television 101 until wireless connection is established, according to the present exemplary embodiment. In FIG. 3, regarding the processing on the television 101 side, in step S301, the television 101 is in a power off state. In step S302, when a not-illustrated power switch is operated and an input signal is input into the input processing unit 203, the CPU 202 turns the power of the whole television 101 on.

Next, in step S303, immediately after the power is turned on, communication control by the WHDMI sink is started based on control from the CPU 202 of the television 101. In step S304, when the recording medium is inserted into the recording media slot 204 of the television 101, the CPU 202 recognizes that the recording medium has been inserted.

Next, in step S305, the CPU 202 of the television 101 switches protocols, and starts communication control by the WUSB device. In step S306, the USB device 206 of the television 101 searches for the printer 102, which is already under communication control by the WUSB host, and negotiates with the searched printer 102. Then, in step S307, the connection processing is completed.

Regarding the processing on the printer 102 side, in step S308, the printer 102 is in a power off state. In step S309, when a not-illustrated power switch is operated and an input signal is input into the input processing unit 253, the CPU 252 turns the power of the whole printer 102 on. Next, in step S310, communication control by the WUSB host is started based on control from the CPU 252 of the printer 102.

Next, in step S311, the USB host 256 of the printer 102 searches for the television 101, which is already under communication control by the WUSB device, and negotiates with the searched television 101. Then, in step S312, the connection processing is completed.

Figure 4:
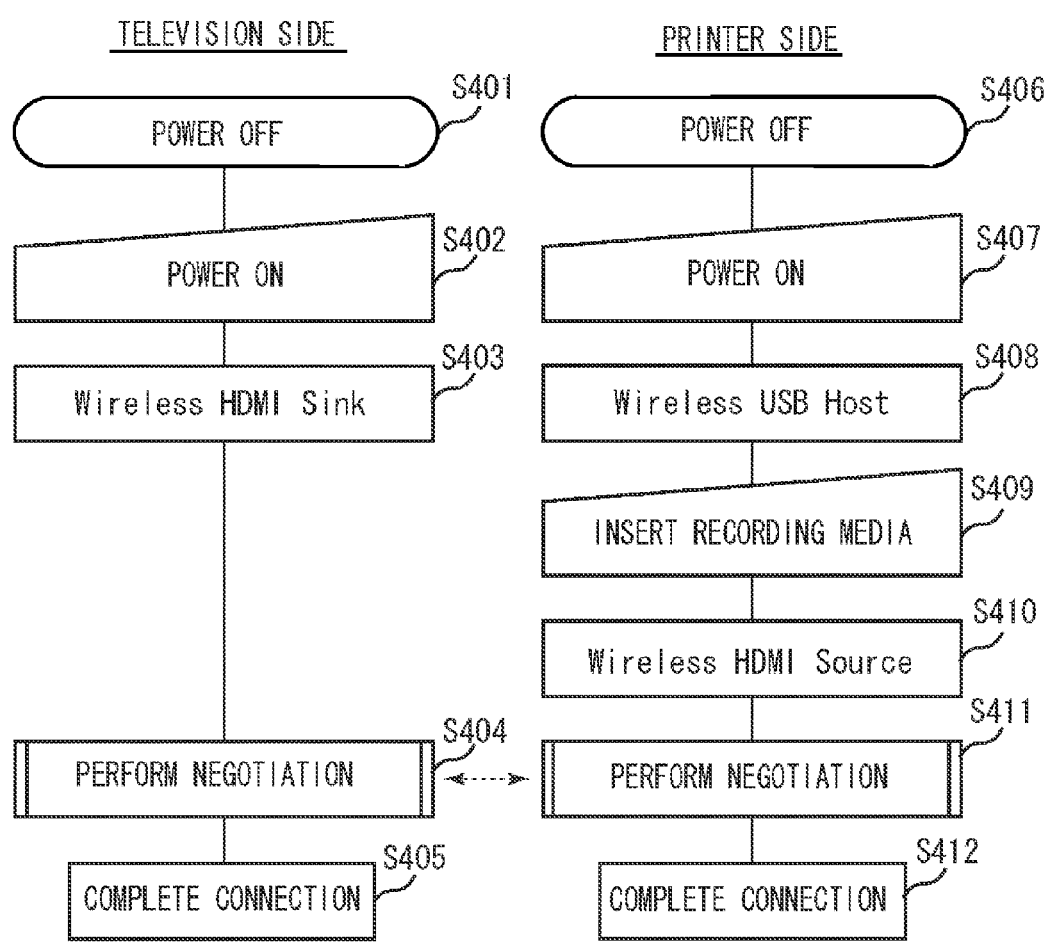
FIG. 4 is a flowchart illustrating an example of the sequence of operations from the point where the power is turned on when a recording medium is inserted into a printer until wireless connection is established, according to the first exemplary embodiment of the present invention.

FIG. 4 is a flowchart illustrating an example of the sequence of operations from the point where the power is turned on when the recording medium is inserted into the printer 102 until wireless connection is established, according to the present exemplary embodiment. Regarding the processing on the television 101 side, first, in step S401, the television 101 is in a power off state. In step S402, when a not-illustrated power switch is operated and an input signal is input into the input processing unit 203, the CPU 202 turns the power of the whole television 101 on.

Next, in step S403, immediately after the power is turned on, communication control by the WHDMI sink is started based on control from the CPU 202 of the television 101. In step S404, the HDMI sink 205 of the television 101 searches for the printer 102, which is already under communication control by the WHDMI source, and negotiates with the searched printer 102. Then, in step S405, the connection processing is completed.

Regarding the processing on the printer 102 side, in step S406, the printer 102 is in a power off state. In step S407, when a not-illustrated power switch is operated and an input signal is input into the input processing unit 253, the CPU 252 turns the power of the whole printer 102 on. Next, in step S408, communication control by the WUSB host is started based on control from the CPU 252 of the printer 102.

In step S409, when the recording medium is inserted into the recording media slot 254 of the printer 102, the CPU 252 of the printer 102 recognizes that the recording medium has been inserted. Next, in step S410, the CPU 252 of the printer 102 switches protocols, and starts communication control by the WHDMI source.

Next, in step S411, the HDMI source 255 of the printer 102 searches for the television 101, which is already under communication control by the WHDMI sink, and negotiates with the searched television 101. Then, in step S412, the connection processing is completed.

Therefore, according to the communication system of the present exemplary embodiment, the user does not need to particularly think about the communication protocol (USB or HDMI), and connection can be established or the connection mode can be switched just by removing and inserting the recording medium. More specifically, when the user inserts the recording medium into the television to view images on the television, the connection with the printer is also completed, and images which the user likes can be quickly printed. Further, when the user inserts the recording medium into the printer for direct printing, the connection with the television is also completed, and the print menu and layout can be confirmed on the television screen.

In a second exemplary embodiment of the present invention, a case will be described where, with the recording medium inserted into either of the devices and a communication established, another recording medium is also inserted into the other device. The internal configuration of the television and the printer, and the connection processing of the television and the printer, are similar to those of the first exemplary embodiment, and thus a description thereof will not be repeated here.

Figure 5:
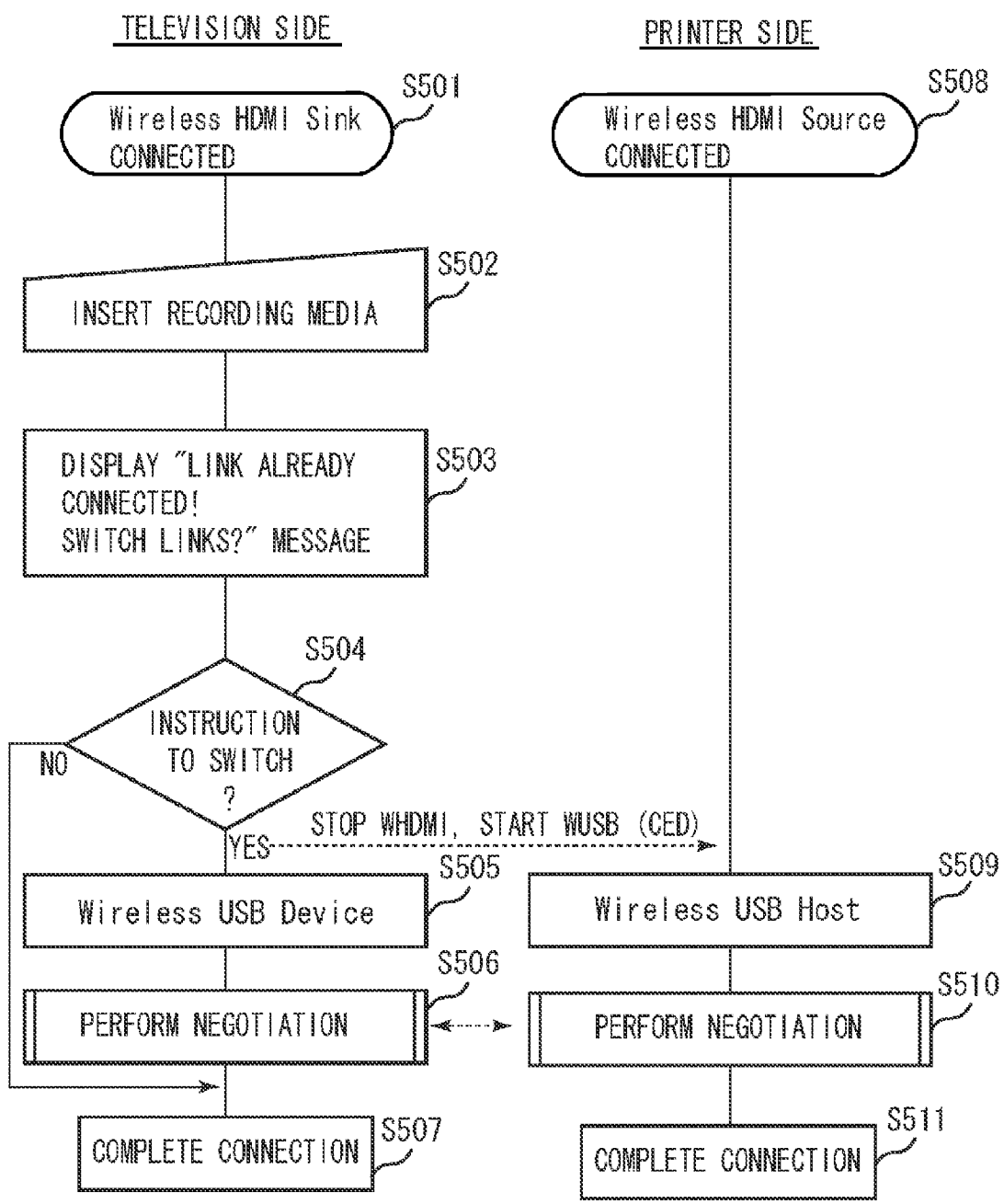
FIG. 5 is a flowchart illustrating an example of a connection processing sequence when a recording medium is inserted into a television in the sate where another recording medium is inserted into a printer and a communication is established, according to a second exemplary embodiment of the present invention.

FIG. 5 is a flowchart illustrating an example of a connection processing sequence when a recording medium is inserted into the television 101 in the state where another recording medium is inserted into the printer 102 and a communication is established, according to the present exemplary embodiment.

Regarding the processing on the television 101 side, first, in step S501, the system is in a state where the recording medium is inserted into the printer 102 in the sequence illustrated in FIG. 4 and WHDMI connection is established. In step S502, when another recording medium is inserted into the recording media slot 204 of the television 101, the CPU 202 of the television 101 recognizes that the recording medium has been inserted.

Next, in step S503, a message indicating that a connection is already established is displayed on the display unit 201 of the television 101 by display control of the CPU 202. In step S504, the CPU 202 of the television 101 determines whether the user has selected to switch the connection by operating the remote control or the like. If it is determined that the user has not selected to switch the connection (NO in step S504), the processing ends.

On the other hand, if it is determined that the user has selected to switch the connection (YES in step S504), the processing proceeds to step S505. In step S505, a "stop WHDMI, start WUSB" command is sent from the television 101 by consumer electronics control (CEC) to the printer 102 via the UWB wireless communication unit 208. Further, the CPU 202 switches communication control from the WHDMI sink to control by the WUSB device. Next, in step S506, the USB device 206 of the television 101 negotiates with the printer 102. In step S507, the connection processing is completed.

Regarding the processing on the printer 102 side, in step S508, the system is in a state where the recording medium is inserted into the printer 102 in the sequence illustrated in FIG. 4 and WHDMI connection is established. In step S509, when the "stop WHDMI, start WUSB" command is received by the UWB wireless communication unit 258, the CPU 252 switches communication control from the WHDMI source to control by the WUSB host. Next, in step S510, the USB host 256 of the printer 102 negotiates with the television 101. In step S511, the connection processing is completed.

Figure 6:
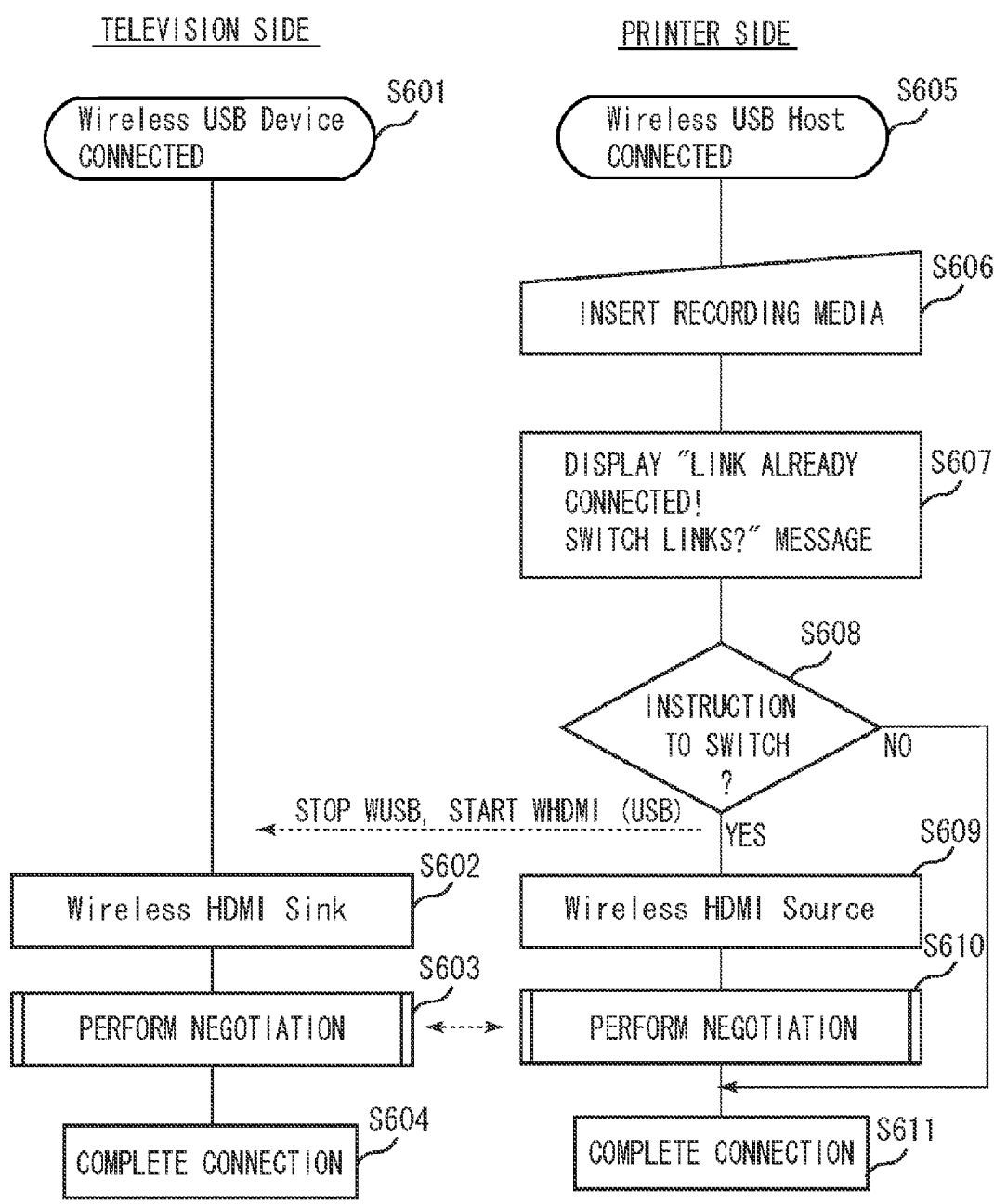
FIG. 6 is a flowchart illustrating an example of a connection processing sequence when a recording medium is inserted into a printer in the state where another recording medium is inserted into a television and a communication is established, according to the second exemplary embodiment of the present invention.

FIG. 6 is a flowchart illustrating an example of a connection processing sequence when a recording medium is inserted into the printer 102 in the state where another recording medium is inserted into the television 101 and a communication is established, according to the present exemplary embodiment. Regarding the processing on the television 101 side, first, in step S601, the system is in a state where the recording medium is inserted into the television 101 in the sequence illustrated in FIG. 3 and WUSB connection is established.

In step S602, when a below-described "stop WUSB, start WHDMI" command is received by the UWB wireless communication unit 208, the CPU 202 switches communication control from the WUSB device to control by the WHDMI sink. Next, in step S603, the HDMI sink 205 of the television 101 negotiates with the printer 102. In step S604, the connection processing is completed.

Regarding the processing on the printer 102 side, in step S605, the system is in a state where the recording medium is inserted into the television 101 in the sequence illustrated in FIG. 3 and WUSB connection is established. In step S606, when another recording medium is inserted into the recording media slot 254 of the printer 102, the CPU 252 of the printer 102 recognizes that the recording medium has been inserted.

Next, in step S607, a message indicating that a connection is already established is displayed on the display unit 251 of the printer 102 by display control of the CPU 252. In step 608, the CPU 252 of the printer 102 determines whether the user has selected to switch the connection by operating the remote control or the like. If it is determined that the user has not selected to switch the connection (NO in step S608), the processing ends.

On the other hand, if it is determined that the user has selected to switch the connection (YES in step S608), the processing proceeds to step S609. In step S609, a "stop WUSB, start WHDMI" command is sent from the printer 102 by the CEC to the television 101 via the UWB wireless communication unit 258. Further, the CPU 252 switches communication control from the WUSB host to control by the WHDMI source. Next, in step S610, the HDMI source 255 of the printer 102 negotiates with the television 101. In step S611, the connection processing is completed.

Therefore, according to the present exemplary embodiment, in a state where connection is already established, there is no need to particularly think about the communication protocol (USB or HDMI), and the connection mode can be switched just by removing and inserting the recording medium. More specifically, when the user inserts the recording medium into the television to view images on the television, the connection mode with the printer is switched, and images which the user likes can be quickly printed. Further, when the user inserts the recording medium into the printer for direct printing, the connection mode with the television is switched, and the print menu and layout can be confirmed on the television screen.

In a third exemplary embodiment of the present invention, a case will be described where, with the power of either of the devices off, a recording medium is inserted into the other device. The internal configuration of the television and the printer is similar to that of the first exemplary embodiment, and thus a description thereof will not be repeated here.

Figure 7:
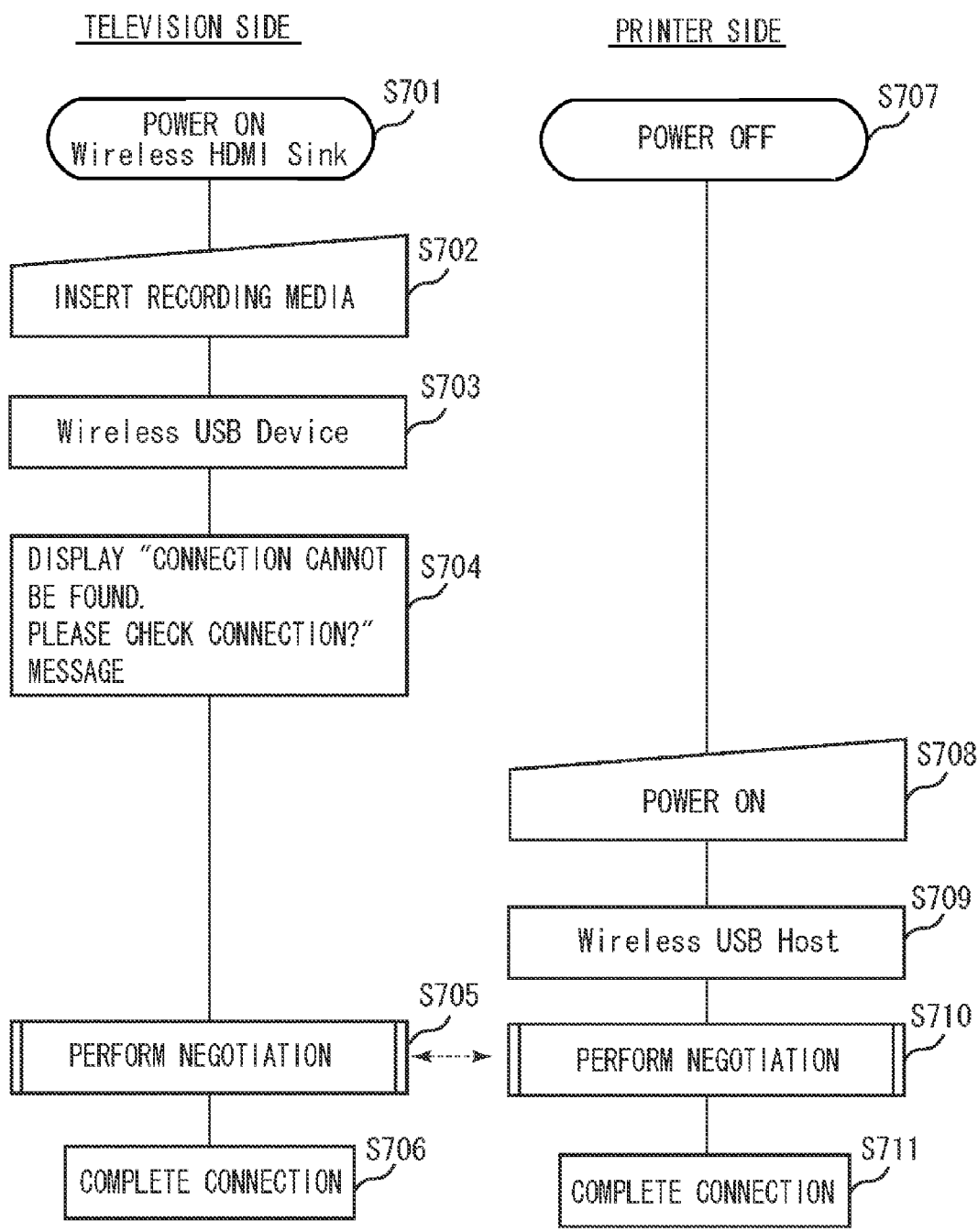
FIG. 7 is a flowchart illustrating an example of a connection processing sequence when a recording medium is inserted into a television in the state where the power of a printer is in an off state, according to a third exemplary embodiment of the present invention.

FIG. 7 is a flowchart illustrating an example of a connection processing sequence when a recording medium is inserted into the television 101 with the power of the printer 102 in an off state, according to the present exemplary embodiment. Regarding the processing on the television 101 side, first, in step S701, the television 101 is under communication control by the WHDMI sink based on the sequence described in steps S401 to S403 of FIG. 4. At this stage, the printer 102 is in an off state.

In step S702, when the recording medium is inserted into the recording media slot 204 of the television 101, the CPU 202 of the television 101 recognizes that the recording medium has been inserted. Next, in step S703, the CPU 202 of the television 101 switches protocols, and switches communication control from the WHDMI sink to control by the WUSB device. Further, the USB device 206 searches for the printer 102 which is already under communication control by the USB host.

However, since at this stage the printer 102 power is off, the television 101 cannot find the printer 102. Thus, in step S704, after a fixed period of time has elapsed, a message indicating that the printer 102 cannot be found is displayed on the display unit 201 of the television 101 by display control of the CPU 202.

After confirming this message, the user turns the printer 102 power on, and the printer 102 starts communication control by the WUSB host. Consequently, in step S705, the USB device 206 of the already operating television 101 searches for the printer 102, and negotiates with the printer 102. Then, in step S706, the connection processing is completed.

Regarding the processing on the printer 102 side, in step S707, the printer 102 is in a power off state. In step S708, when a not-illustrated power switch is operated and an input signal is input into the input processing unit 253, the CPU 252 turns the power of the printer 102 on. Next, in step S709, communication control by the WUSB host is started by control from the CPU 252 of the printer 102.

Next, in step S710, the USB device 256 of the printer 102 searches for the television 101 already under communication control by the WUSB device, and negotiates with the searched television 101. Then, in step S711, the connection processing is completed.

Figure 8:
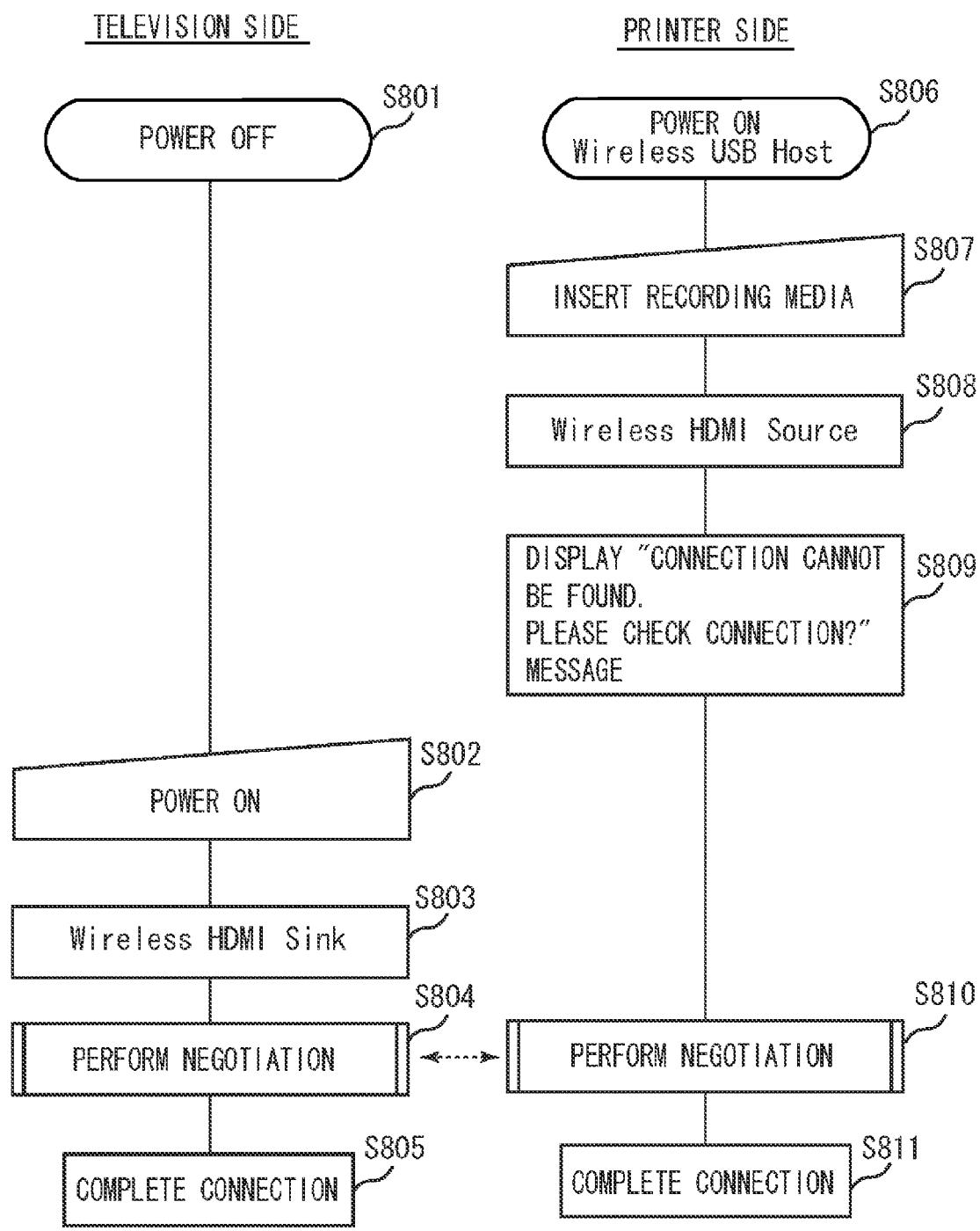
FIG. 8 is a flowchart illustrating an example of a connection processing sequence when a recording medium is inserted into a printer in the state where the power of a television is in an off state, according to the third exemplary embodiment of the present invention.

FIG. 8 is a flowchart illustrating an example of a connection processing sequence when a recording medium is inserted into the printer 102 with the power of the television 101 in an off state, according to the present exemplary embodiment. Regarding the processing on the television 101 side, first, in step S801, the power of the television 101 is in an off state. In step S802, when a not-illustrated power switch is operated and an input signal is input into the input processing unit 203, the CPU 202 turns the power of the television 101 on. Next, in step S803, communication control by the WHDMI sink is started by control from the CPU 202 of the television 101.

Next, in step S804, the HDMI sink 205 of the television 101 searches for the printer 102 already under communication control by the WHDMI source, and negotiates with the searched printer 102. Then, in step S805, the connection processing is completed.

Regarding the processing on the printer 102 side, in step S806, the printer 102 is under communication control by the WUSB host based on the sequence described in steps S308 to S310 of FIG. 3. At this stage, the television 101 is in an off state.

In step S807, when the recording medium is inserted into the recording media slot 254 of the printer 102, the CPU 252 of the printer 102 recognizes that the recording medium has been inserted. Next, in step S808, the CPU 252 of the printer 102 switches protocols, and switches communication control from the WUSB host to control by the WHDMI source. Further, the HDMI source 255 searches for the television 101 which is already under communication control by the WHDMI sink.

However, since at this stage the television 101 power is off, the printer 102 cannot find the television 101. Thus, in step S809, after a fixed period of time has elapsed, a message indicating that the television 101 cannot be found is displayed on the display unit 251 of the printer 102 by display control of the CPU 252.

After confirming this message, the user turns the television 101 power on, and the television 101 starts communication control by the WHDMI sink. Consequently, in step S810, the HDMI source 255 of the already operating printer 102 searches for the television 101, and negotiates with the television 101. Then, in step S811, the connection processing is completed.

Therefore, according to the present exemplary embodiment, connection can be established by turning on the power even when the other connection party cannot be found.

In a fourth exemplary embodiment of the present invention, a case will be described where recording media are simultaneously inserted into the television and the printer. The internal configuration of the television and the printer is similar to that of the first exemplary embodiment, and thus a description thereof will not be repeated here.

FIG. 9 is a flowchart illustrating an example of a connection processing sequence when recording media are simultaneously inserted into the television 101 and the printer 102, according to the present exemplary embodiment. Regarding the processing on the television 101 side, first, in step S901, the television 101 is under communication control by the WHDMI sink based on the sequence described in steps S401 to S403 of FIG. 4.

In step S902, when the recording medium is inserted into the recording media slot 204 of the television 101, the CPU 202 of the television 101 recognizes that the recording medium has been inserted. At this stage, another recording medium is simultaneously inserted into the printer 102 as well. Next, in step S903, the CPU 202 of the television 101 switches protocols, and switches communication control from the WHDMI sink to control by the WUSB device. Further, the USB device 206 searches for the printer 102 which is already under communication control by the USB host.

Although the television 101 is in a standby state with the device under communication control by the WUSB host, since a recording medium is also inserted into the printer 102, the printer 102 is in a standby state with the device under communication control by the WHDMI sink. Consequently, since the other connection party cannot be found by the television 101, in step S904, after a fixed period of time has elapsed, a message indicating that the other connection party cannot be found is displayed on the display unit 201 of the television 101 by display control of the CPU 202.

After confirming this message, when the user removes the recording medium inserted into the printer 102, the printer 102 is rebooted as the communication control by the WUSB host. Consequently, in step S905, the USB device 206 of the television 101 under communication control by the WUSB device searches for the printer 102, and negotiates with the printer 102. Then, in step S906, the connection processing is completed.

Regarding the processing on the printer 102 side, in step S907, the printer 102 is under communication control by the WUSB host based on the sequence described in steps S308 to S310 of FIG. 3.

In step S908, when the recording medium is inserted into the recording media slot 254 of the printer 102, the CPU 252 of the printer 102 recognizes that the recording medium has been inserted. At this stage, another recording medium is simultaneously inserted into the television 101 as well. Next, in step S909, the CPU 252 of the printer 102 switches protocols, and switches communication control from the WUSB host to control by the WHDMI source. Further, the HDMI source 255 searches for the television 101 which is already under communication control by the WHDMI sink.

Similar to as described above, although the printer 102 is in a standby state with the device under communication control by the WHDMI sink, since a recording medium is also inserted into the television 101, the television 101 is in a standby state with the device under communication control by the WUSB host. Consequently, since the other connection party cannot be found by the printer 102, in step S910, after a fixed period of time has elapsed, a message indicating that the other connection party cannot be found is displayed on the display unit 251 of the printer 102 by a display control of the CPU 252.

After confirming this message, in step S911, when the recording medium inserted into the recording media slot 254 of the printer 102 is removed by the user, the CPU 252 of the printer 102 recognizes that the recording medium has been removed. Then, in step S912, the CPU 252 of the printer 102 switches protocols, and switches communication control from the WHDMI source to control by the WUSB host.

In step S913, the USB host 256 of the printer 102 under communication control by the WUSB host searches for the television 101, and negotiates with the television 101. Then, in step S914, the connection processing is completed.

While FIG. 9 illustrates a case where the recording medium in the printer 102 is removed, the processing is the same for when removing the recording medium in the television 101. In this case, the television 101 comes under communication control by the WHDMI sink, and the printer 102 comes under communication control by the WHDMI source.

Therefore, according to the present exemplary embodiment, a message indicating that the other connection party cannot be found is displayed on the respective devices even when, for example, different users simultaneously inserted recording media into both the television and the printer. After confirming this message, the user can maintain a desired connection mode or switch between connection modes by removing the recording medium from either of these devices.

Each of the above-described exemplary embodiments of the present invention is merely an example for describing the present invention. The respective exemplary embodiments can also be appropriately combined. The respective units which configure the display apparatus and printing apparatus in the above-described exemplary embodiments of the present invention, and the respective steps of the control method of the display apparatus and printing apparatus, can be realized by operating the respective apparatus based on a program stored on a random access memory (RAM), read only memory (ROM) and the like of a computer. This program and a computer-readable storage medium on which such a program is stored are also included in the present invention.

Further, the present invention can also be embodied as a system, apparatus, method, program, storage medium or the like. Specifically, the present invention may be applied in a system configured from a plurality of devices, or applied in an apparatus configured from a single device.

Further, the present invention also includes the supply of a software program for realizing the functions of the above-described exemplary embodiments (in the exemplary embodiments, programs corresponding to the flowcharts illustrated in FIGS. 3 to 9) to a system or an apparatus either directly or remotely, and the reading and executing of the supplied program code by a computer of that system or apparatus.

Therefore, to realize the functional processing of the present invention with a computer, the program code itself which is to be installed in the computer also realizes the present invention. Namely, the computer program for realizing the functional processing of the present invention is itself also included in the present invention.

In such a case, the program may be object code, a program executed by an interpreter, script data supplied to an operating system (OS) and the like, as long as it has the function of a program.

Examples of the storage medium for supplying the program include a floppy disk, a hard disk, an optical disk, a magneto optical disk (MO), a compact disc read only memory (CD-ROM), a CD-recordable (CD-R), a CD-rewritable (CD-RW), a magnetic tape, a non-volatile memory card, a ROM, a digital versatile disc (DVD-ROM, DVD-R) and the like.

In addition, an example of a method for supplying the program includes using a browser of a client computer to connect to an Internet homepage (website). The computer program itself of the present invention, or a compressed file containing an auto-install function, can also be supplied from the web page by downloading onto a storage medium, such as a hard disk.

Further, the present invention can also be realized by dividing the program code constituting the program of the present invention into a plurality of files, and downloading each of those files from different homepages. Namely, a World Wide Web (WWW) server which allows a plurality of users to download the program files for realizing the functional processing of the present invention by a computer is also included in the present invention.

Further, as another method, the program of the present invention may be encrypted, stored on a storage medium such as a CD-ROM, and distributed to a user. A user who clears certain conditions is allowed to download key information for unlocking the encryption from a homepage via the Internet. By using that key information, the encrypted program can be realized by executing and installing on a computer.

Further, the functions of the exemplary embodiments can be realized by having a computer execute a read program. In addition, the functions of the exemplary embodiments can be realized also by having the OS operating on the computer perform all or part of the actual processing based on an instruction from the program.

In addition, as another method, the functions of the exemplary embodiments may be realized by first writing a program read from a storage medium into a memory which is provided on a function expansion board inserted into a computer or a function expansion unit connected to the computer. Subsequently, based on an instruction from that program, a CPU and the like provided on that function expansion board or function expansion unit performs all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-270129 filed Oct. 20, 2008, which is hereby incorporated by reference herein in its entirety.

What is claimed is:

1. A display control apparatus capable of communicating with a printing apparatus, the display control apparatus comprising:
a connection unit configured to allow a removable storage medium to be connected thereto; and a communication control unit configured to control a first communication for receiving a video signal based on image data from the printing apparatus using a first communication protocol for receiving the video signal, and a second communication for sending image data to the printing apparatus using a second communication protocol for sending data to be used for printing, wherein the communication control unit communicates with the printing apparatus using the second communication protocol in response to the removable storage medium being connected to the connection unit, and communicates with the printing apparatus using the first communication protocol in response to receiving a notification indicating that the removable storage medium is connected to the printing apparatus, wherein switching between the first communication protocol and the second communication protocol occurs automatically, without user intervention, after connecting the removable storage medium, and wherein, when the removable storage medium is connected to the connection unit and when the printing apparatus is in an off state, a message is displayed on the display control apparatus indicating that the printing apparatus cannot be found or prompting activation of the printing apparatus to an on state to establish a connection between the display control apparatus and the printing apparatus.

2. The display control apparatus according to claim 1, wherein the communication control unit performs control such that when the display control apparatus is powered on, the display control apparatus enters a state of using the first communication protocol.

3. The display control apparatus according to claim 1, further comprising a display control unit configured to, when a storage medium is connected to the connection unit in a state where the display control apparatus is connected to the printing apparatus by the first communication protocol, display a message indicating that connection is already established on a display unit.

4. The display control apparatus according to claim 1, wherein, when a user operation instructs switching connection after a storage medium is connected to the connection unit in a state where the display control apparatus is connected to the printing apparatus by the first communication protocol, the communication control unit sends, to the printing apparatus, a command for switching a communication protocol to be used by the printing apparatus from the first communication protocol to the second communication protocol.

5. A printing apparatus capable of communicating with a display control apparatus, the printing apparatus comprising:

a connection unit configured to allow a removable storage medium to be connected thereto; and a communication control unit configured to control a first communication for sending a video signal based on image data to the display control apparatus using a first communication protocol for sending the video signal, and a second communication for receiving image data from the display control apparatus using a second communication protocol for receiving data to be used for printing, wherein the communication control unit communicates with the display control apparatus using the second communication protocol in response to the removable storage medium being connected to the connection unit, and communicates with the display control apparatus using the first communication protocol in response to receiving a notification indicating that the removable storage medium is connected to the display control apparatus, wherein switching between the first communication protocol and the second communication protocol occurs automatically, without user intervention, after connecting the removable storage medium, and wherein, when the removable storage medium is connected to the connection unit and when the display control apparatus is in an off state, a message is displayed on the printing apparatus indicating that the display control apparatus cannot be found or prompting activation of the display control apparatus to an on state.

6. The printing apparatus according to claim 5, wherein the communication control unit performs control such that when the printing apparatus is powered on, the printing apparatus enters a state of using the second communication protocol.

7. The printing apparatus according to claim 5, further comprising a display control unit configured to, when a storage medium is connected to the connection unit in a state where the printing apparatus is connected to the display control apparatus by the second communication protocol, display a message indicating that connection is already established on a display unit.

8. The printing apparatus according to claim 5, wherein, when a user operation instructs switching connection after a storage medium is connected to the connection unit in a state where the printing apparatus is connected to the display control apparatus by the second communication protocol, the communication control unit sends, to the display control apparatus, a command for switching a communication protocol to be used by the display control apparatus from the second communication protocol to the first communication protocol.

* * * * *